United States Patent
Ma

(10) Patent No.: US 7,664,348 B2
(45) Date of Patent: Feb. 16, 2010

(54) OPTICAL SWITCH WITH RECONFIGURABLE BROADCASTING AND COMBINING CAPABILITIES

(75) Inventor: Jian Ma, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 0 days.

(21) Appl. No.: 12/004,749

(22) Filed: Dec. 21, 2007

(65) Prior Publication Data

US 2009/0162009 A1 Jun. 25, 2009

(51) Int. Cl.
*G02B 6/26* (2006.01)
(52) U.S. Cl. .......................................... 385/18; 359/17
(58) Field of Classification Search ............. 385/1, 385/15, 31, 33; 359/558
See application file for complete search history.

(56) References Cited

U.S. PATENT DOCUMENTS

| | | | | |
|---|---|---|---|---|
| 4,644,160 A | * | 2/1987 | Arimoto et al. | 250/203.1 |
| 5,960,133 A | * | 9/1999 | Tomlinson | 385/18 |
| 6,097,859 A | * | 8/2000 | Solgaard et al. | 385/17 |
| 6,204,946 B1 | | 3/2001 | Aksyuk et al. | 398/9 |
| 6,330,102 B1 | * | 12/2001 | Daneman et al. | 359/290 |
| 6,427,038 B1 | * | 7/2002 | Britz et al. | 385/18 |
| 6,445,841 B1 | * | 9/2002 | Gloeckner et al. | 385/17 |
| 6,480,319 B2 | * | 11/2002 | Daneman et al. | 359/290 |
| 6,483,962 B1 | * | 11/2002 | Novotny | 385/18 |
| 6,487,334 B2 | | 11/2002 | Ducellier et al. | |
| 6,539,138 B2 | | 3/2003 | Holmes | |
| 6,570,681 B1 | * | 5/2003 | Favalora et al. | 359/17 |
| 6,603,894 B1 | * | 8/2003 | Pu | 385/18 |
| 6,618,517 B2 | | 9/2003 | Ducellier et al. | |
| 6,643,425 B1 | * | 11/2003 | Bowers et al. | 385/18 |
| 6,657,771 B2 | * | 12/2003 | Okayama | 359/290 |
| 6,711,316 B2 | * | 3/2004 | Ducellier | 385/17 |
| 6,711,319 B2 | * | 3/2004 | Hoen | 385/18 |
| 6,810,165 B2 | * | 10/2004 | Golub et al. | 385/18 |
| 6,819,819 B2 | | 11/2004 | Zhou | |
| 6,928,207 B1 | * | 8/2005 | Trisnadi et al. | 385/16 |
| 6,934,438 B2 | * | 8/2005 | Hoke | 385/16 |
| 6,941,073 B2 | * | 9/2005 | McGuire | 398/84 |
| 6,947,613 B1 | * | 9/2005 | Roxlo | 385/1 |
| 6,950,570 B1 | * | 9/2005 | Novotny | 385/18 |
| 7,003,187 B2 | * | 2/2006 | Frick et al. | 385/16 |
| 7,039,267 B2 | | 5/2006 | Ducellier et al. | |
| 7,058,251 B2 | * | 6/2006 | McGuire, Jr. | 385/16 |
| 7,286,763 B2 | | 10/2007 | Fishman et al. | |
| 7,286,764 B1 | * | 10/2007 | Trisnadi et al. | 398/84 |
| 7,315,670 B2 | * | 1/2008 | Kobayashi et al. | 385/17 |
| 7,346,234 B2 | * | 3/2008 | Davis et al. | 385/18 |
| 7,362,930 B2 | * | 4/2008 | Davis et al. | 385/18 |
| 2002/0164114 A1 | * | 11/2002 | Golub et al. | 385/18 |
| 2003/0124435 A1 | * | 7/2003 | Rich et al. | 430/1 |
| 2003/0179985 A1 | | 9/2003 | Zhou | |
| 2005/0281557 A1 | | 12/2005 | Fishman et al. | |

* cited by examiner

*Primary Examiner*—Frank G Font
*Assistant Examiner*—Peter Radkowski
(74) *Attorney, Agent, or Firm*—Koppel, Patrick, Heybl & Dawson

(57) ABSTRACT

An optical switch provides the ability to broadcast one input signal to multiple output channels and to combine multiple input signals into single output channel. The signal broadcast pattern is reconfigurable. One or more diffractive optical elements are used in the switch.

31 Claims, 6 Drawing Sheets

OPTICAL SWITCH WITH RECONFIGURABLE BROADCASTING AND COMBINING CAPABILITIES

BACKGROUND OF THE INVENTION

1. Field of the Invention

This invention relates to an optical switch capable of broadcasting one or more input signals to multiple output channels in a reconfigurable broadcast pattern, and combining multiple input signals into one output channel.

2. Description of the Related Art

Conventional optical switches receive and direct a single input signal to a single selected output. To broadcast an input signal to all output ports, some optical switches require an additional output port, N input ports as well as a 1×N splitter positioned between the output port and N input ports. To implement broadcasting, the input signal is switched to the added output port and is split by the 1×N splitter into multiple signals that are each fed back to a respective added input port. Each of the multiple added input ports then redirect their respective signal to a respective output port. The approaches used in conventional optical switches do not provide for transmitting a single input signal to multiple, reconfigurable outputs. Optical switches that utilize the conventional 1×N splitter require an additional output port and N input ports, increase insertion loss, add to complexity and cost. Additionally, this broadcasting method does not provide a reconfigurable broadcast pattern; as a result, it wastes optical power when 1-to-N broadcasting is not necessary (e.g., when only need 1-to-M, and M<N).

Additionally, conventional optical switches lack beam-combining capability.

SUMMARY OF THE INVENTION

At least one adjustable input light director is positioned to direct input light to a diffractive optical Element (DOE). The DOE diffracts the light into one or more light beams. Each of a plurality of output light directors, is positioned to receive and redirect a respective one or more of the light beams along a respective optical channel.

A method for optical switching comprises selecting between an intermediate light director or a diffractive optical element (DOE), directing input light to the selected DOE or intermediate light director, the DOE diffracting the input light into one or more light beams, and redirecting the one or more light beams into respective optical output channels.

An optical switch comprises one or more output light directors which direct received light into respective output channels and one or more diffractive optical elements (DOE), each of which has a unique, fixed diffraction pattern such that light directed onto the DOE is broadcast to a respective one or more of the reflectors, and at least one adjustable input light director positioned to direct input light onto a selected DOE.

An optical switch comprises at least one diffractive optical element (DOE) and one or more adjustable input light directors for receiving and directing a plurality of input light beams to a selected DOE, so that the selected DOE combines the input light beams into a single beam along an output channel.

DETAILED DESCRIPTION OF THE INVENTION

The term "broadcast" used herein can refer to diffract light into multiple copies. The elements described herein may be used in different combinations and may be substituted.

Figure 1:
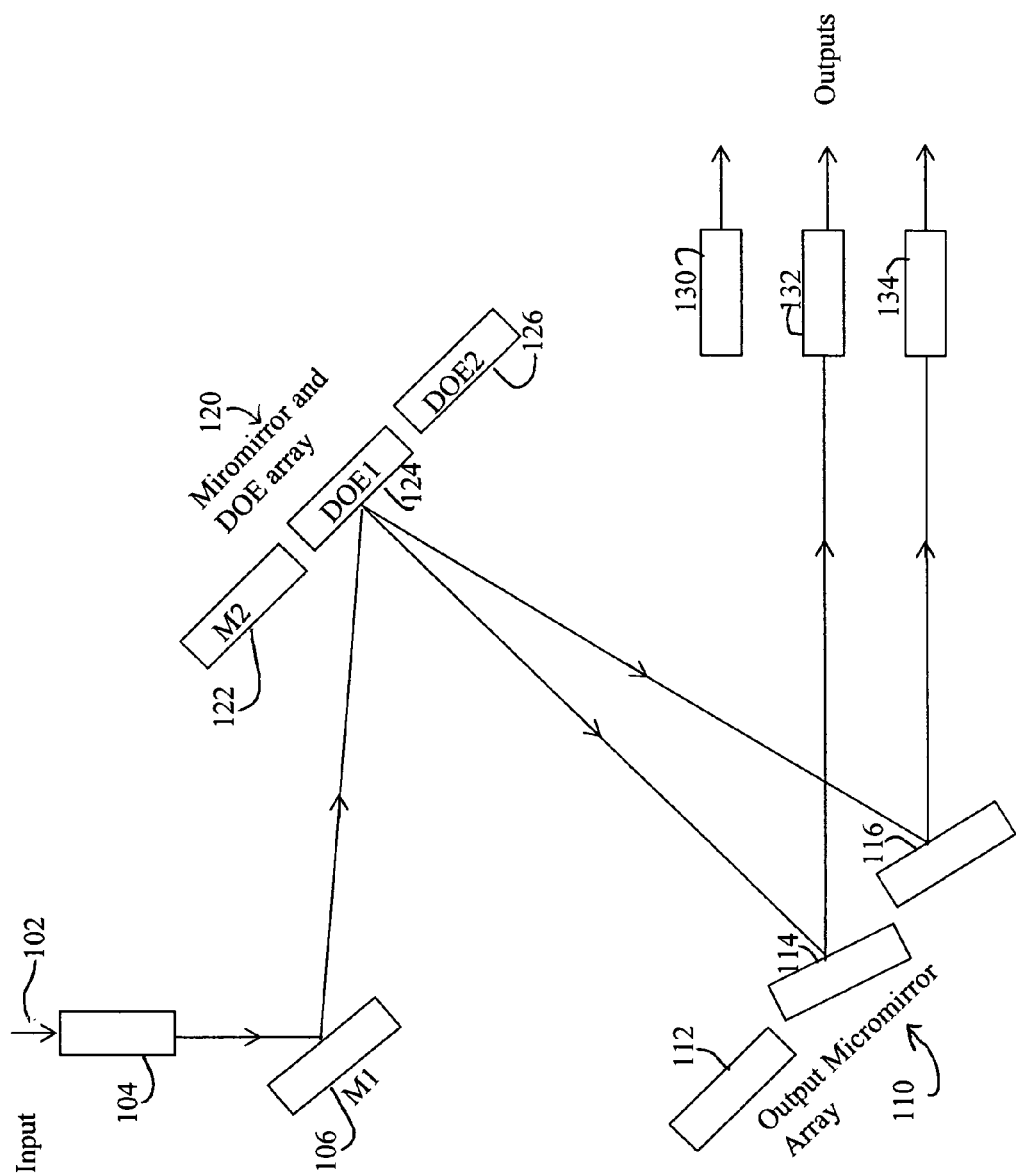
FIG. 1 is a schematic diagram illustrating one embodiment of an optical switch that receives a single input light beam and uses one or more DOEs for diffracting an input light.

FIG. 1 shows one embodiment in which an input signal 102 is initially received by an input collimator 104 and directed to an input light director 106 ("M1"), which is preferably a reflector, such as a rotatable micromirror, although other devices that perform the same or similar function may be used. Preferably, a computer or other controller device controls M1's rotation automatically. The computer/controller selects a direction or output light path using either a pre-programmed value, one that adjusts to real-time events, or one set by an operator. Where larger mirrors are used, or in the absence of a computer/controller device, M1 may be rotated manually to select the output direction/path of the reflected light.

As shown in FIG. 1, M1's rotation to a particular position allows it to reflect light to a selected DOE, or to an optional intermediate light director 122 ("M2"). One or more DOEs such as 124 and 126 ("DOE1" and "DOE2", respectively) and/or one or more intermediate light directors such as M2 are preferably arranged in an array 120 for selection by M1 through its rotational position.

Each DOE is configured to diffract the input light beam into one or more beams, each of which is incident on a respective output light directors. FIG. 1 shows one embodiment of output light directors 112, 114, and 116 preferably arranged in an array, such as micromirror array 110. Additional or fewer output light directors can be used.

Each DOE preferably creates a unique diffraction pattern, which is defined by the number of diffracted beams created by the DOE and the relative direction in which the diffracted beams travel from the DOE. To produce the diffraction pattern, the DOE can be a computer-generated hologram with holographic fringes formed on the surface of a substrate (for example, a glass substrate) through chemical etching, laser scribing, stamping or other fabrication methods. The DOE can also be a thin or thick volume hologram with holographic fringes formed inside the volume of a holographic medium through exposure to the light interference patterns. Each DOE is preferably affixed to an array 120, but can also be individually rotated to control and adjust the output direction of the entire diffraction light pattern from the DOE.

In addition to directing light to one or more DOEs, M1 can also direct light to the intermediate light director M2, which is preferably a micromirror. Rather than diffract the input light into multiple copies, M2 reflects the input light signal to a single output path. Like M1, M2 is also rotatable to adjust the direction of its output ray, and can be computer controlled. The rotatability of M2 enables it to select a single output path among many, rather than being limited to only one fixed output path, which allows for implementing a 1×N switch (where N is the number of output ports).

The DOE and optional intermediate light director M2 direct light to a set of rotatable output light directors 112, 114, and 116 that can be arranged as an array 110, which is preferably a micromirror array. Like M1 and M2, the position of the output light directors can be set either manually or by a controller or computer to direct light out to a set of output collimators. Angular dispersion caused by a DOE that may introduce angle deviation at the output light directors, can be compensated through the rotation of the output light directors, so that the switch can work with light over a certain wavelength band, for example an entire C band (from 1530 nm to 1565 nm). Each output light director directs the light beam from DOE (or M2) to a respective output collimator. Rotation of the output directors allows maximum light coupling into the output ports via the collimators. Where a single DOE diffracts the light into multiple beams, the output light directors that receive each of the multiple beams redirect the beam to a respective output collimator. Additionally, M1, M2 and the output light directors may be rotated/adjusted independently, or in coordination with one another, to output one or more copies of the input light ray.

Figure 2A:
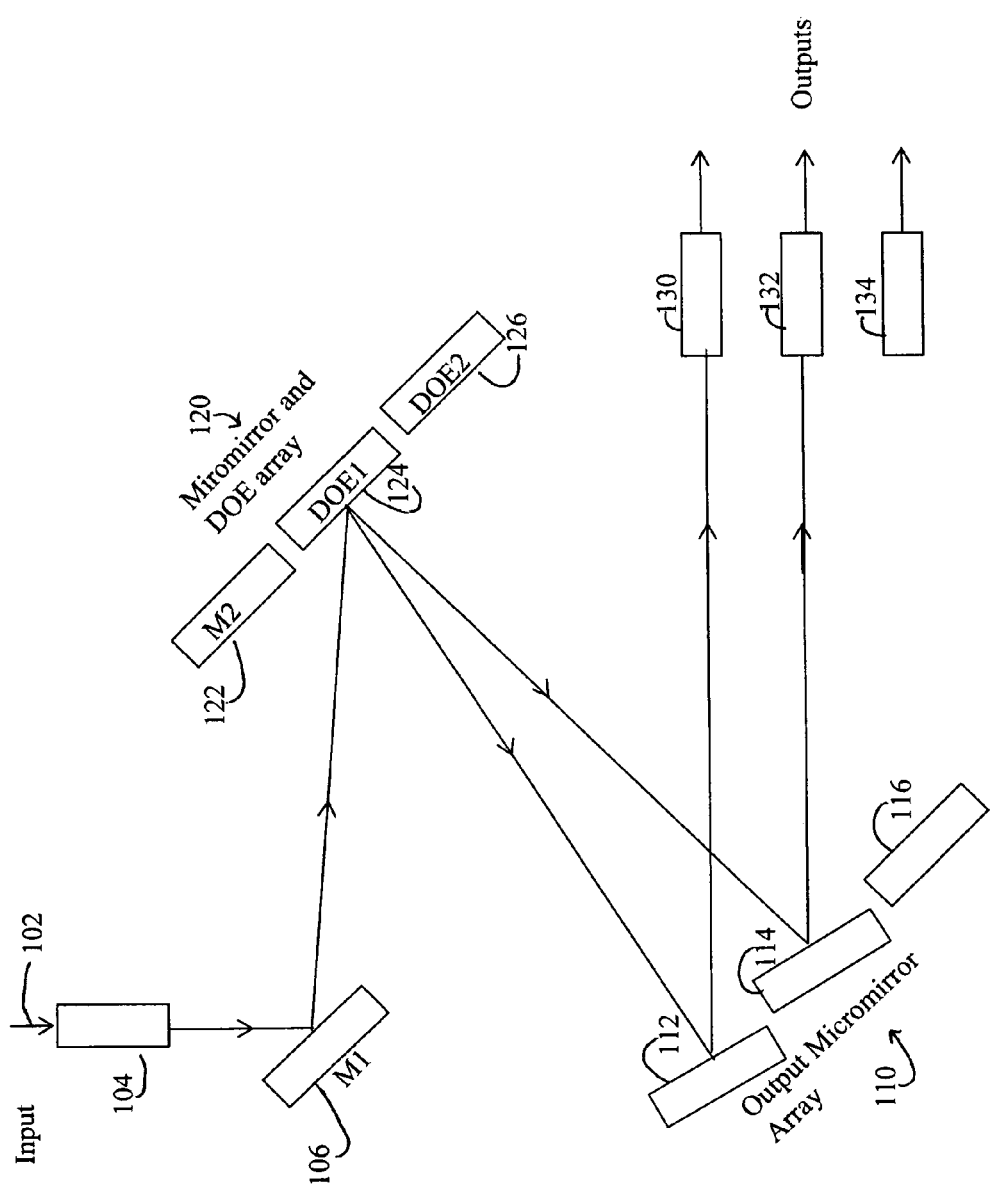
FIGS. 2(a)-(c) are schematic diagrams illustrating some of the many diffraction patterns and output light created when a single input light signal is diffracted by one or more DOEs or by an optional intermediate reflector.

FIGS. 2(a) (b) and (c) illustrate some examples of output patterns that can be generated using light director M1, DOEs, optional intermediate light director M2, and the set of output light directors. Other light patterns are also contemplated, and no embodiment is limited to the specific light patterns, paths or number of elements and their positions depicted in the Figures.

FIG. 2(a) illustrates one example of a light pattern created when DOE1 is selected by M1. In FIG. 2(a), M1 is rotated to direct light from an optional input collimator 104 to DOE1. In this example, DOE1 diffracts the light from M1 into two light beams. One light beam is directed to output light director 114 and the other to output light director 116. DOE1 can alternatively be fabricated to generate more or fewer light beams, and/or to transmit the beams to a different combination of output light directors. Additionally, DOE1 itself may optionally be rotatable to select a different combination of output light directors. The output light directors can also be rotated to redirect the light from the DOEs to the respective output collimators. In this example, output light directors 112 and 114 reflect the light onto output collimators 130 and 132, respectively.

Figure 2B:
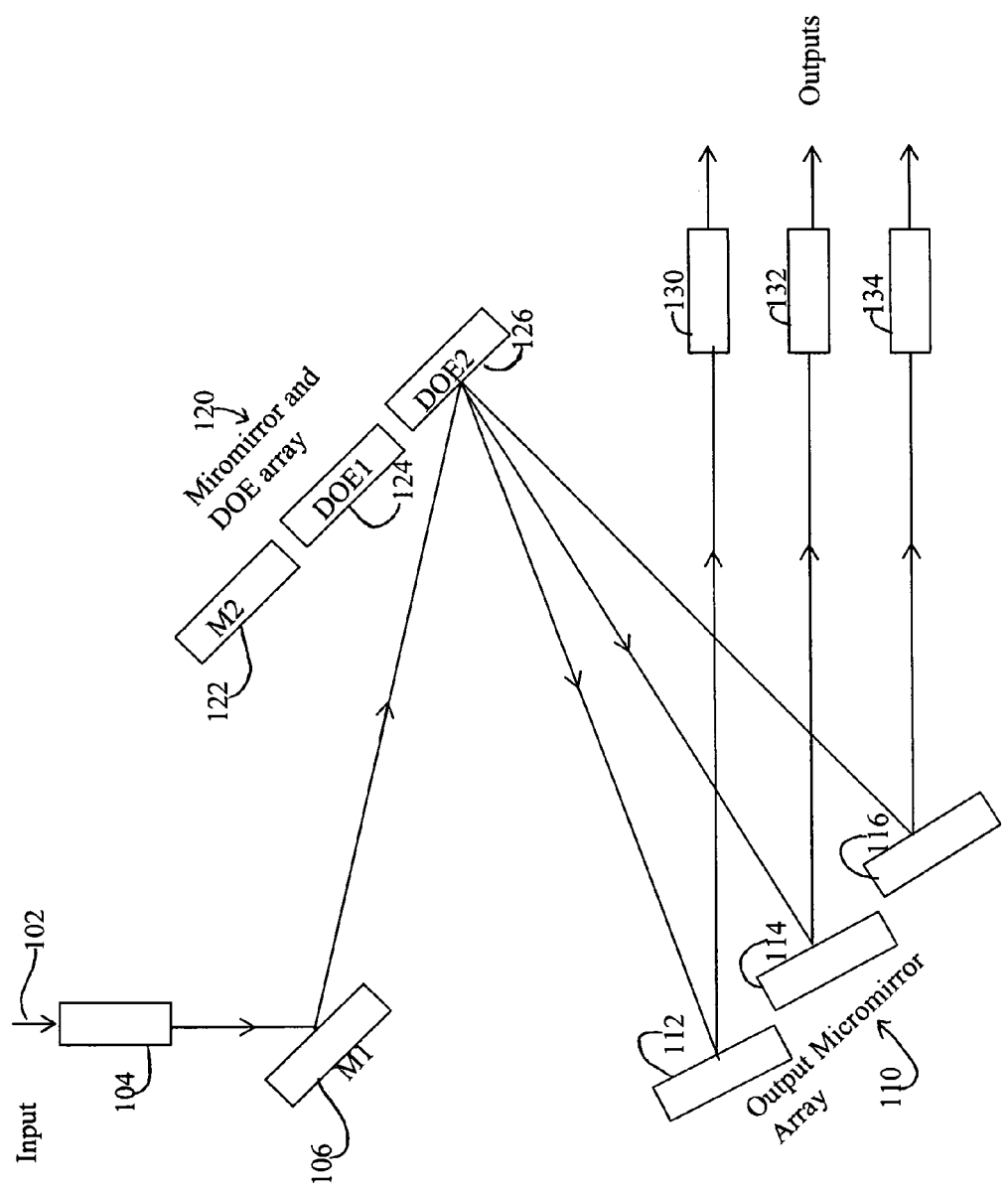

FIG. 2(b) shows an example of a light pattern created when M1 is rotated to select DOE2, so that light from the optional input collimator 104 is directed onto DOE2. In this example, DOE2 is fabricated to diffract the input light into three output beams. Each beam is directed to a respective output light director 112, 114, and 116 to broadcast the input light to all output light directors and collimators. DOE2 can also be configured to diffract the incoming light into fewer or more light beams, and to transmit beams to a different combination of output light directors.

Figure 2C:
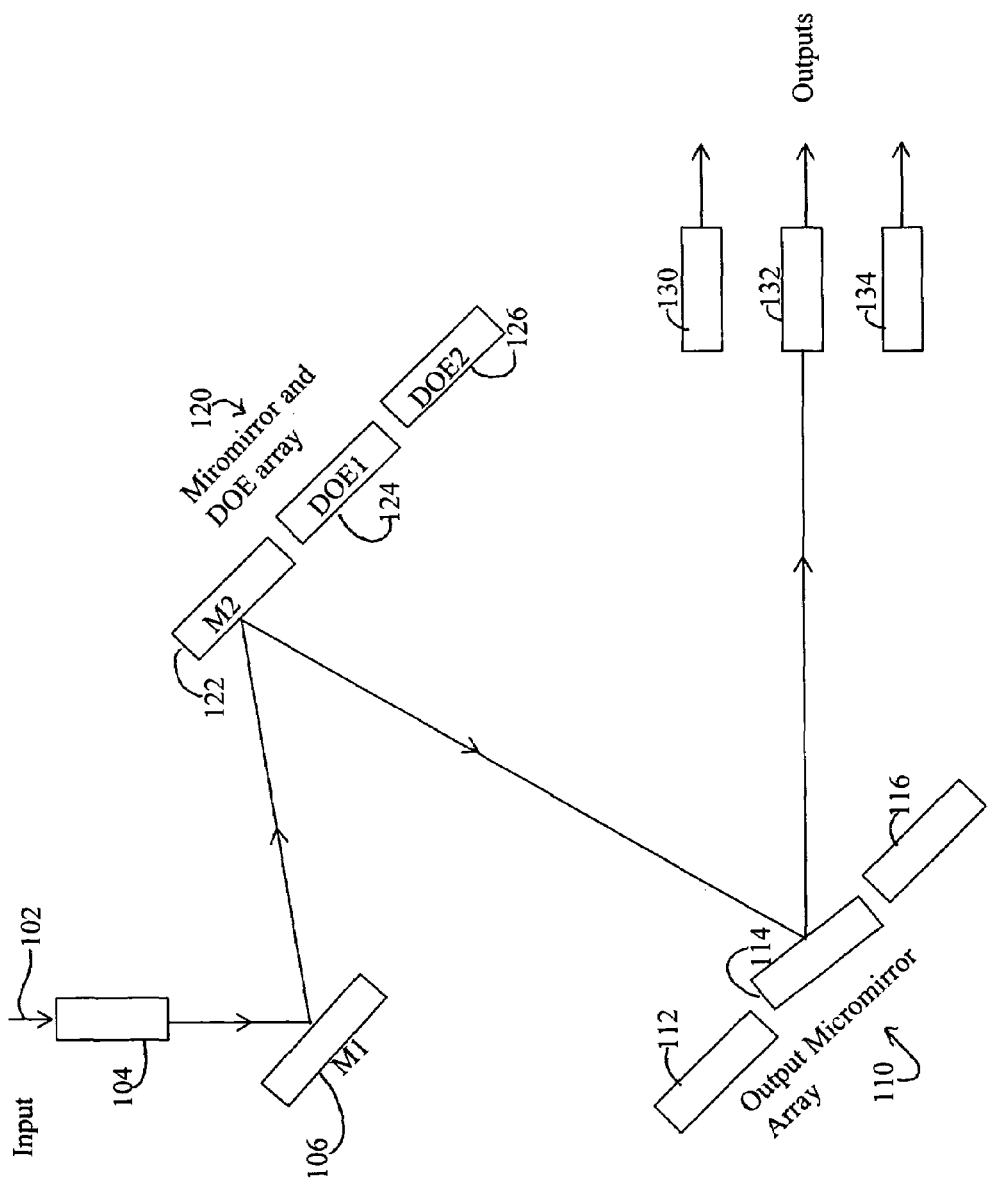

In the example depicted in FIG. 2(c), M1 is rotated to direct the input light ray to intermediate light director M2. M2 is preferably a mirror, although any other reflective, deflective, and rotatable element can also be used. In this example, M2 is rotated to direct the input light to output light director 114, which in turn is positioned to receive and direct the reflected light to output collimator 132. Alternatively, M2 could be rotated to direct the light to either output light director 112 or 116, which are rotated to direct light to output collimators 130 and 134, respectively. In this manner, a single input light signal can be directed to a single and any output.

Figure 3:
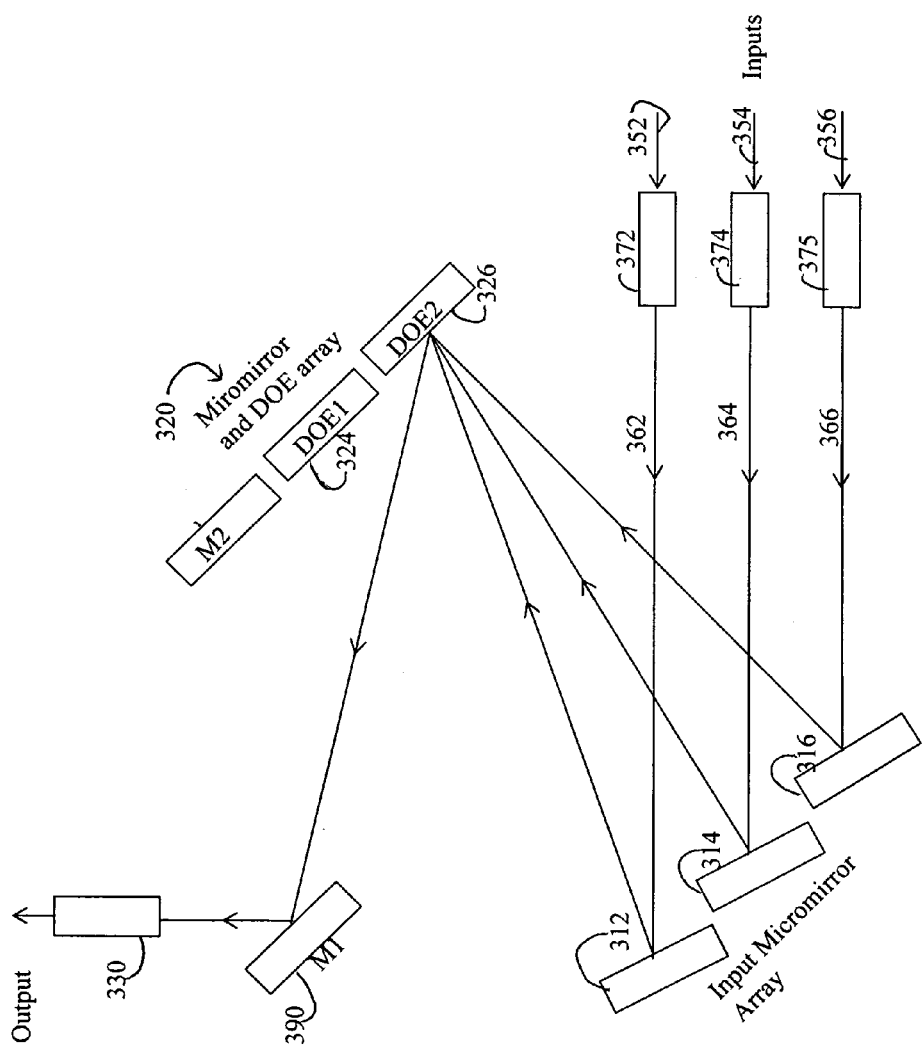
FIG. 3 is a schematic diagram illustrating combining multiple input light beams into one output channel through a DOE.

By flipping the input and output ports in FIG. 2, the same switch is able to implement a beam-combining function as illustrated in FIG. 3. In FIG. 3, one or more input collimators 372, 374, and 375 are arranged to receive input light beams 352, 354, and 356, and direct them to their respective light directors, 312, 314, and 316. These light directors are shown as input micromirror array in FIG. 3. In the absence of input collimators 372, 374, and 375, light rays 352, 354, and 356 are incident directly on the input light directors. The input light directors redirect the incoming beams to one DOE (e.g., DOE2). The DOE is designed to combine the incoming beams into a single beam and redirect it to output light director 390 shown in FIG. 3. The input light directors, 312, 314 and 316 are preferably reflectors, such as mirrors, and are preferably rotatable to direct the light to a single selected DOE. In FIG. 3, the selected DOE is 326. The DOEs are preferably arranged in an array format 320, and the output light director 390 is preferably a reflector, such as a mirror, and is preferably rotatable to direct the light to an output collimator, 330. Additionally, each DOE may be rotatable.

Figure 4:
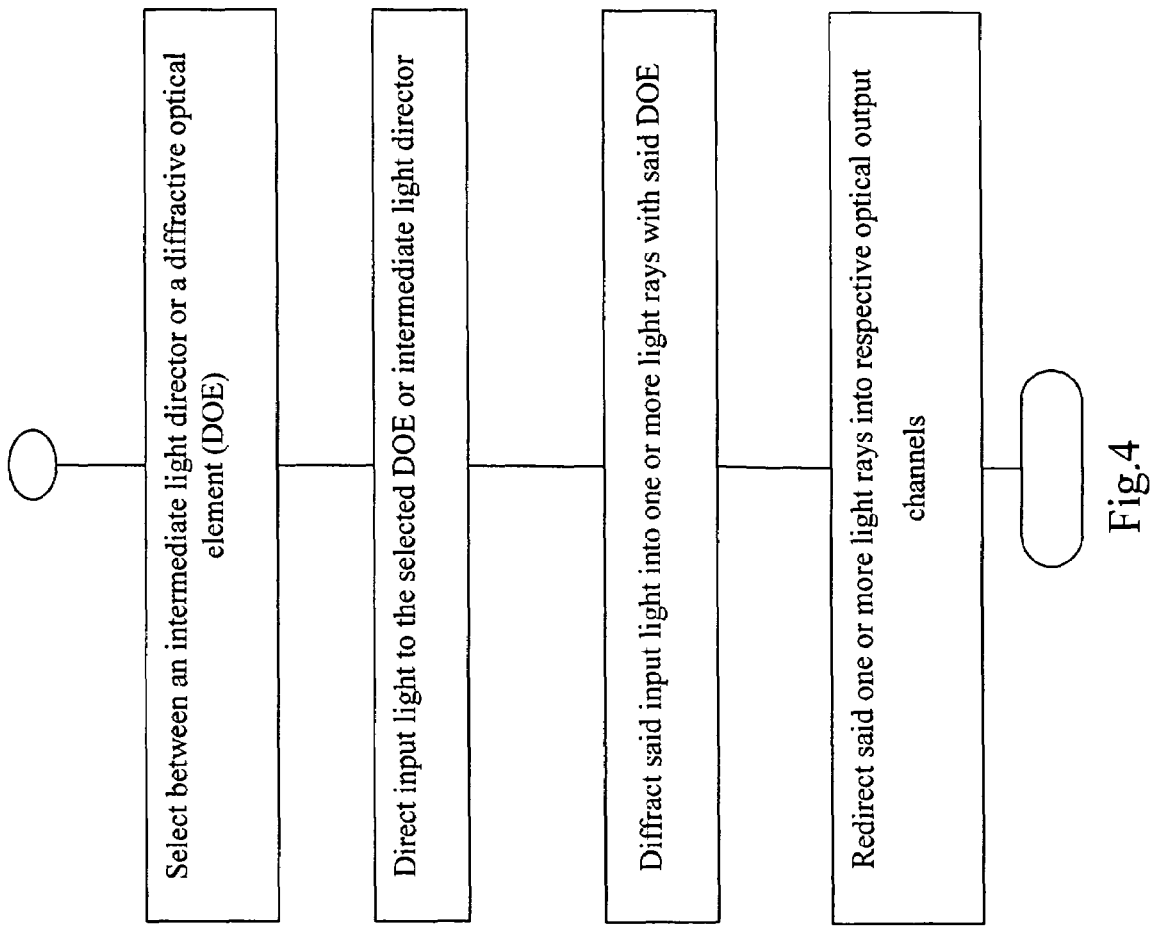
FIG. 4 is a flow diagram illustrating a method for optical switching using a DOE.

FIG. 4 illustrates a method for optical switching comprising selecting a intermediate light director (preferably a mirror) or a diffractive optical element (DOE) for each input light from one or more DOEs, directing input light to the selected DOE said diffractive optical element, or the said intermediate light director, diffracting said input light into one or more light rays with said DOE or redirecting the light with the said intermediate light director, and redirecting said one or more light rays into respective optical output channels.

While various implementations and embodiments of the optical switch with beam broadcasting capabilities system have been described, it will be apparent to those of ordinary skill in the art that many more are possible.

What is claimed is:

1. An optical switch, comprising:
   at least one diffractive optical element (DOE);
   at least one adjustable input light director positioned to direct input light to one of said at least one DOE, said one DOE arranged to broadcast said light into a plurality of light beams, wherein each of said plurality of light beams comprises the same wavelength composition as said input light; and
   a plurality of output light directors, each of said output light directors positioned to receive and redirect a respective one or more of said light beams along a respective optical output channel.

2. The system of claim 1, further comprising an intermediate light director positioned to receive light from said input light director redirect said light to one of said plurality of output light directors.

3. The system of claim 1, wherein said DOE comprises a computer generated hologram having holographic fringes arranged on a substrate surface.

4. The system of claim 1, wherein said DOE comprises a volume hologram with holographic fringes arranged in a volume of a holographic medium, said fringes arranged to diffract said light.

5. The system of claim 1, wherein said input light director is a rotatable mirror.

6. The system of claim 1, wherein said input light director is a liquid crystal light deflector.

7. The system of claim 1, wherein said output light directors are rotatable mirrors.

8. The system of claim 1, wherein said output light directors are liquid crystal light deflectors.

9. The system of claim 1, wherein said output light directors are arranged in an array.

10. The system of claim 9, wherein said array is a micromirror array.

11. The system of claim 1, wherein said DOEs are arranged in an array.

12. The system of claim 2, wherein said DOEs and said intermediate light director are arranged in an array.

13. A method for optical switching, comprising:
selecting between an intermediate light director or a single diffractive optical element (DOE) from a plurality of DOEs; directing input light to the selected DOE or intermediate light director;
broadcasting said input light into a plurality of light beams with said selected DOE, wherein each of said plurality of light beams comprises the same wavelength composition as said input light; and
redirecting said plurality of light beams into respective optical output channels.

14. An optical switch, comprising:
one or more output light directors which direct received light into respective output channels;
one or more diffractive optical elements (DOE), each of which has a unique, fixed broadcasting pattern such that light directed onto a selected one of said one or more DOEs is broadcast to a respective one or more of said reflectors as output beams, wherein each of said output beams comprises the same wavelength composition as said received light; and
an adjustable input light director positioned to direct input light onto said selected DOE.

15. The system of claim 14, further comprising an intermediate light director positioned to receive and direct light from said input light director and redirect said light to one of said plurality of output light directors.

16. The system of claim 14, wherein said DOE comprises hologram with holographic fringes fabricated on the surface of a substrate or in the volume of a holographic medium to broadcast said light.

17. The system of claim 14, wherein said input light director is a rotatable mirror.

18. The system of claim 14, wherein said input light director is a liquid crystal light deflector.

19. The system of claim 14, wherein said output light directors are rotatable mirrors.

20. The system of claim 14, wherein said output light directors are liquid crystal light deflectors.

21. The system of claim 14, wherein said output light directors are arranged in an array.

22. The system of claim 21, wherein said array is a micromirror array.

23. The system of claim 14, wherein said DOEs are arranged in an array.

24. An optical switch, comprising:
at least one diffractive optical element (DOE);
a plurality of adjustable input light directors for receiving and directing a plurality of input light beams to a selected DOE, said selected DOE arranged to combine said input light beams into a single beam for output along an output channel, wherein said single beam comprises the same wavelength composition as each of said plurality of input light beams.

25. The system of claim 24, further comprising one or more output light directors positioned to receive and direct said single beam along said one or more output channels.

26. The system of claim 24, wherein said DOE comprises a hologram with holographic fringes fabricated on the surface of a substrate or in the volume of a holographic medium to diffract said plurality of light beams.

27. The system of claim 24, wherein said one or more input light directors are rotatable mirrors.

28. The system of claim 24, wherein said one or more input light directors comprise liquid crystal light deflectors.

29. The system of claim 25, wherein said one or more output light directors are arranged in an array.

30. The system of claim 29, wherein said array is a micromirror array.

31. The system of claim 24, wherein said DOEs are arranged in an array.

* * * * *